United States Patent [19]
Nakamura et al.

[11] Patent Number: 5,012,509
[45] Date of Patent: Apr. 30, 1991

[54] COMMUNICATION CONFERENCE APPARATUS AND METHOD FOR REMOTE CONFERENCING

[75] Inventors: Koozoo Nakamura, Hitachiota; Seizi Maruo, Hitachi, both of Japan

[73] Assignee: Hitachi, Ltd., Tokyo, Japan

[21] Appl. No.: 453,930

[22] Filed: Dec. 20, 1989

[30] Foreign Application Priority Data

Dec. 23, 1988 [JP] Japan ............................ 63-323333

[51] Int. Cl.$^5$ .............................................. H04N 1/42
[52] U.S. Cl. ...................................... 379/53; 379/202; 358/85
[58] Field of Search ........................ 379/53, 54, 96, 97, 379/98, 100, 202, 203, 204; 358/85

[56] References Cited

U.S. PATENT DOCUMENTS

| 4,529,842 | 7/1985 | Levy et al. | 379/202 |
| 4,577,065 | 3/1986 | Frey et al. | 379/204 |
| 4,691,347 | 9/1987 | Stanley et al. | 379/203 |

OTHER PUBLICATIONS

Electronics and Communications in Japan, vol. 72, No. 12, Dec. 1989.

Design of Electronic Files at Audio Graphic Teleconference Terminal, Dec. 1988.

*Primary Examiner*—Jin F. Ng
*Assistant Examiner*—Ahmad F. Matar
*Attorney, Agent, or Firm*—Antonelli, Terry, Stout & Kraus

[57] ABSTRACT

A conference system identifies and manages conferences in terms of the conference host name, conference name and conference partner name. At the setup a conference, a conference host name, conference name and conference partner name are registered, and, in addition, material names and material supplier names of materials used for the conference are registered. The communication conference system stores conference management information in the first, second and third files in the hierarchical structure. The first file stores conferences host names, the second file stores conference names and conference partner names, and the third file stores conference material names and conference material supplier names. A specific conference is identified by a logical AND operation of the conference host name in the first file and the conference name and conference partner name in the second file, and a specific conference material is identified by a logical AND operator of the conference material name and conference material supplier name in the third file.

19 Claims, 9 Drawing Sheets

FIG. 1
(a) CONTENT OF CONFERENCE MANAGEMENT ON COMMUNICATION CONFERENCE TERMINAL A
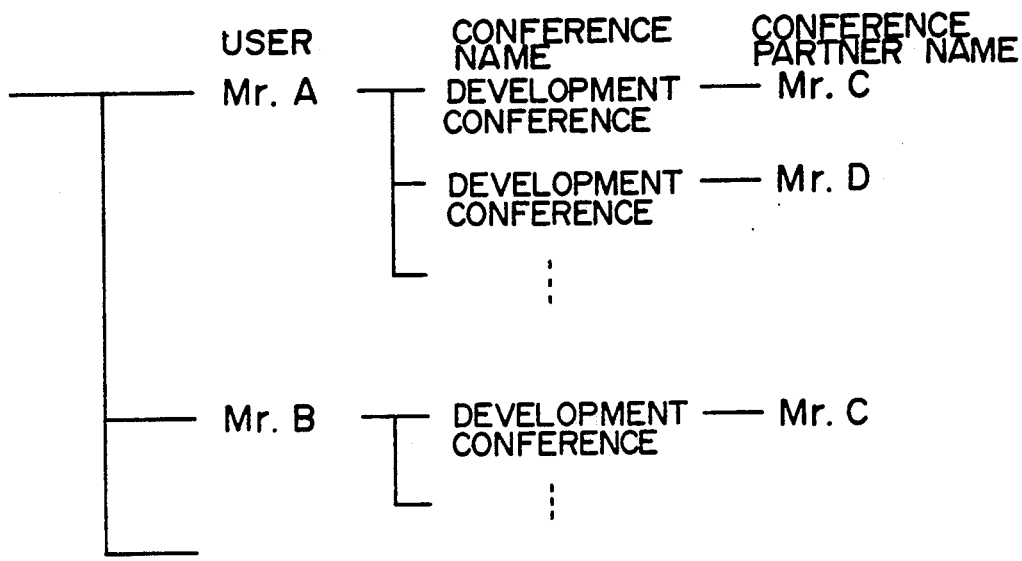
(b) CONTENT OF CONFERENCE MANAGEMENT ON COMMUNICATION CONFERENCE TERMINAL B
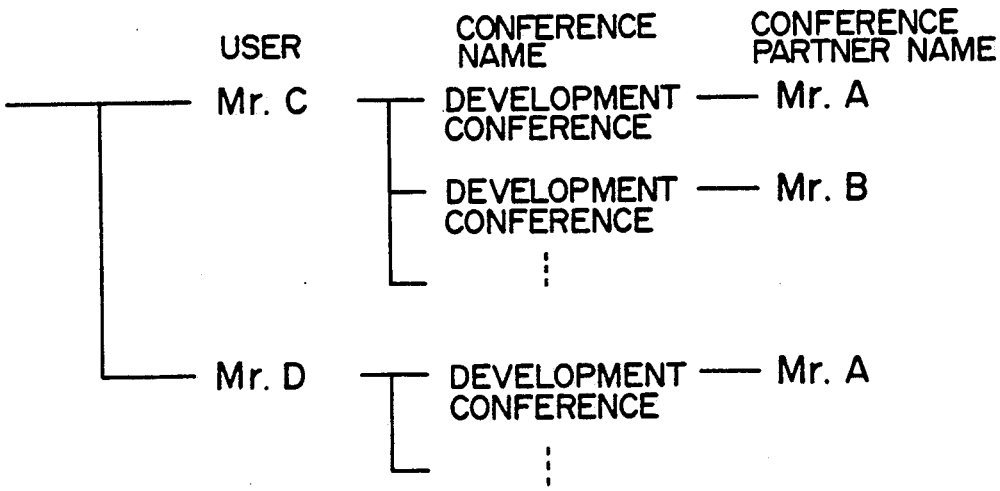

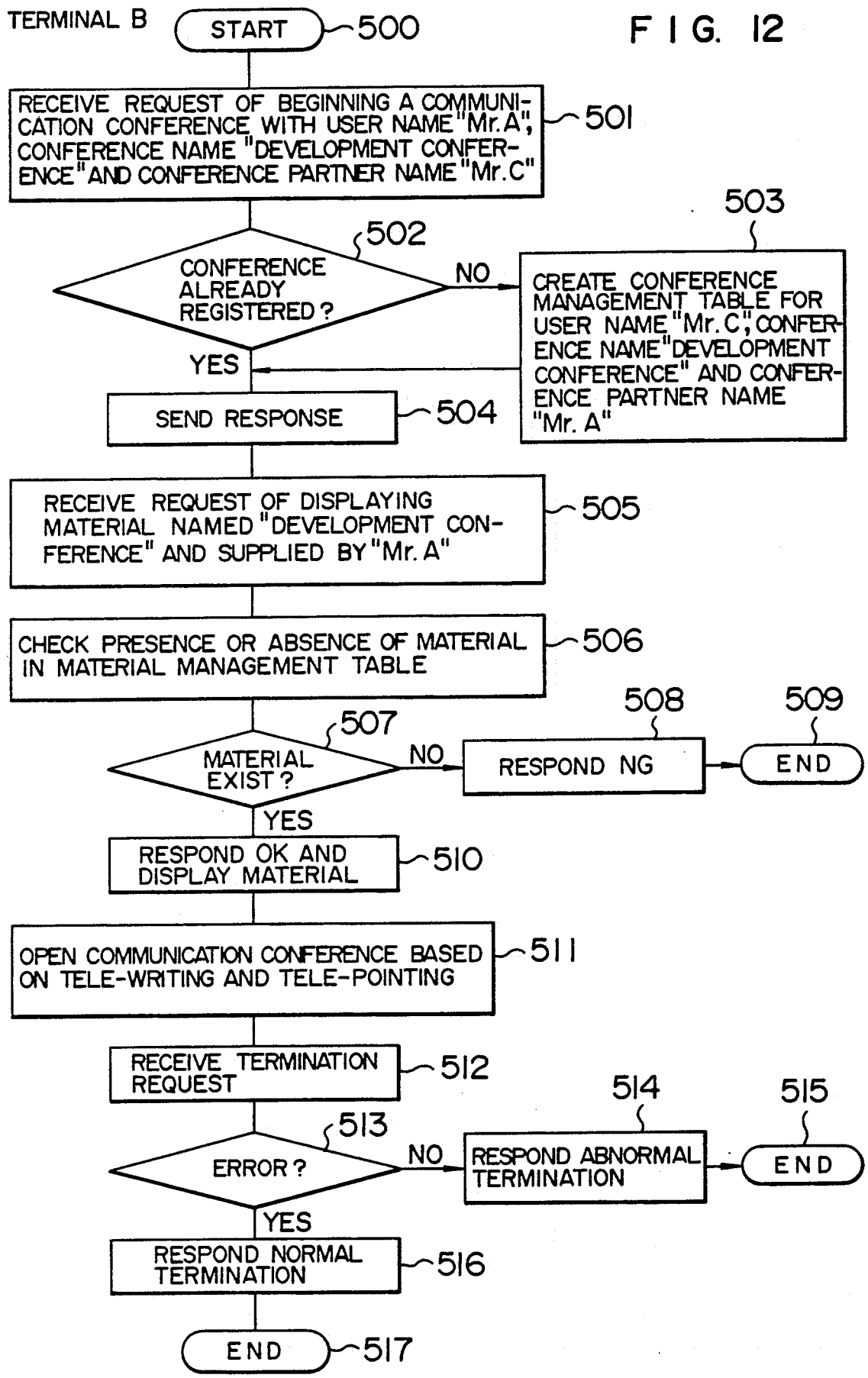

COMMUNICATION CONFERENCE APPARATUS AND METHOD FOR REMOTE CONFERENCING

BACKGROUND OF THE INVENTION

This invention relates to a communication conference system, and more particularly to a method of managing conferences and materials of conferences for the communication conference system which performs a remote conference through a communication line.

A conventional method of managing conferences and materials of conferences for communication conferences is described in the study practice report, Vol. 36, No. 12, Multimedia Teleconference Terminal CT-1, pp. 1593-1600 (will be cited as publication 1). This method identifies conferences by conference name, and is capable of managing multiple conferences having different names using a single communication conference terminal. The method manages materials for a conference by their material identification names which belong to the conference name.

The above-mentioned prior art does not consider the use of the same communication conference terminal by more than one user (host or partner of conference), and therefore in registering a new conference name, it is necessary to review conference names which have been registered by other users and register a new conference by a name other than the registered names. In this method, even if a unique conference name is registered, it can possibly be already registered on the partner's communication conference terminal. This possibility is especially high when conducting a communication conference with a plurality of terminals. Duplicate registration of a conference name makes it difficult to identify a specific conference. In order to avoid this situation, it is necessary to review registered conference names not only on the host terminal but also on the partner terminals.

Another problem of the above-mentioned prior art is that when the host and partner of a conference have prepared materials by the same material name independently, it is not possible to identify which party has prepared each material, and therefore all users must have a prior arrangement of material names to avoid the duplication before exchanging the materials.

SUMMARY OF THE INVENTION

An object of this invention is to provide a conference management method which facilitates the registration and identification of conferences on communication conference terminals used by multiple users, and to provide a conference material management method which facilitates the registration and identification of materials used for the conferences.

In order to achieve the above objective, conferences are identified for management by a logical AND operation of the conference host identifier, conference identifier and conference partner identifier. The materials of the conference are identified for management by logical AND operation of the material identifier and material supplier identifier for each conference which is identified for management by a logical AND operation of the conference host identifier, conference identifier and conference partner identifier.

By identifying conferences for management by a logical AND operation of the conference host identifier, conference identifier and conference partner identifier, it becomes possible to readily set up a unique conference on each communication conference terminal by setting up a unique conference by a logical AND operation of the conference identifier and conference partner identifier within the scope of conference managed by the conference host. The conference host can readily set up a unique conference on the conference host communication conference terminal by merely managing conferences related to the host, i.e., a unique conference can be set up on each communication conference terminal by registering a conference name which is different from conference names that have already been registered by oneself.

Materials used for a conference which is identified by the above-mentioned method are identified for management by a logical AND operation of the material identifier and material supplier identifier (any of the conference host identifier or conference partner identifier). Accordingly, by setting material identifiers, without duplication, for materials used for a specific conference by the material supplier, it becomes possible to create conference material which can be identified steadily on each communication conference terminal.

According to this invention, conferences are identified for management by a logical AND operation of the conference host identifier, conference identifier and conference partner identifier, and it provides the effectiveness of steadily identifying conferences for management among the communication conference terminals. In addition, materials of conference are identified for management by a logical AND operation of the conference host identifier, conference identifier, conference partner identifier, material identifier and material supplier identifier, and they are identified steadily for management among the communication conference terminals.

BRIEF DESCRIPTION OF THE DRAWINGS

FIG. 1 shows an example of the management of conferences according to the present invention;

FIGS. 11 and 12 are flowcharts showing the call (designation) of communication conference and the execution of the communication conference between the terminal A and B, with FIG. 11 being a flowchart for the terminal A and FIG. 12 being a flowchart for the terminal B.

DESCRIPTION OF THE PREFERRED EMBODIMENTS

Embodiments of this invention will be described with reference to the drawings. In the following explanation, conference names, conference host names, conference partner names and material names are used as the conference identifier, conference host identifier, conference partner identifier and material identifier, respectively, although they may be replaced with identification codes or the combination of identification codes and names. A conference which takes place between two parties in the explanation may be one in which a plurality of conference partners exist. The conference host name and conference partner identifier may be names of individuals, or may be names of departments, divisions or companies.

Figure 2:
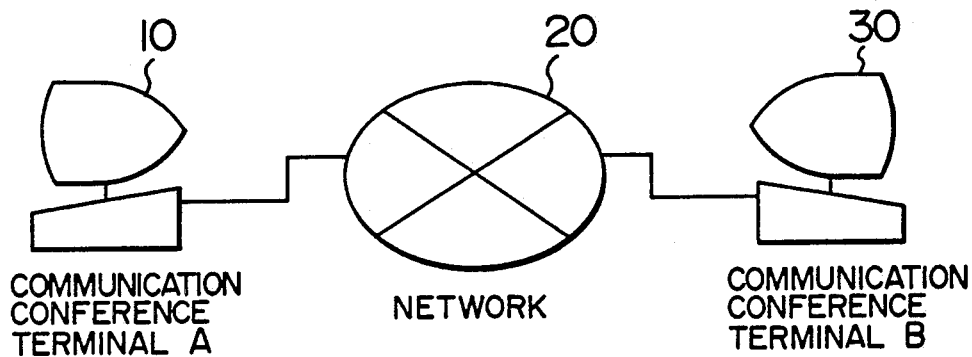
FIG. 2 is a diagram showing the overall communication conference system which comprises communication conference terminals and a communication network.

FIG. 2 shows the overall arrangement of the communication conference system which comprises communication conference terminals and a communication network. The operation of a communication conference terminal, which is described in detail in publication 1, will be briefed in the following. A communication conference terminal A 10 and a communication conference terminal B 30 exchange materials of conference through a communication network 20, and thereafter proceed to the communication conference by displaying the same conference materials on the display screen of both terminals and exchanging such data as voice sound, telepointing and tele-writing. Conference materials of both users are filed before the conference begins, and they can be taken for use during the conference. The communication conference terminals A 10 and B 30 implement the management for the conference and conference materials in performing the communication conference.

FIG. 1 shows, as an embodiment, the content of the inventive conference management method and apparatus of the present invention. Shown by (a) in FIG. 1 is the conference management carried out on the communication conference terminal A 10, and shown by (b) in FIG. 1 is the conference management on the communication conference terminal B 30. The users of the communication conference terminal A 10 are Mr. A and Mr. B. Since each conference is identified for management by a logical AND operation of the conference host name, conference name and conference partner name, Mr. A as a user is allowed to set up the same conference name "Development Conference" as a different conference hosted by another user Mr. B, or vice versa. The user Mr. A is also allowed to set up another conference with a different partner by the same conference name (Development Conference) as his coexisting conference. Accordingly, a conference name can be set up irrespective of conference names which have been registered by other users on the same communication conference terminal, and this eliminates the need of searching for conference names which have already been registered by other users.

Moreover, the conference is set up (identified) on the partner's communication conference terminal in terms of the user's name (conference partner's name seen from the partner's terminal) and the conference name, and therefore the partner's terminal is freed from searching for already registered conference names. On this account, it is easy to register a conference name and the range of choice is wide. Even if the conference name registered by the conference partner is not known/ it is possible to steadily identify conferences and set up a conference name on the partner's communication conference terminal by merely searching the content of conference management by the conference host, whereby it is not necessary to notify the conference name to the conference partner in advance.

Figure 3:
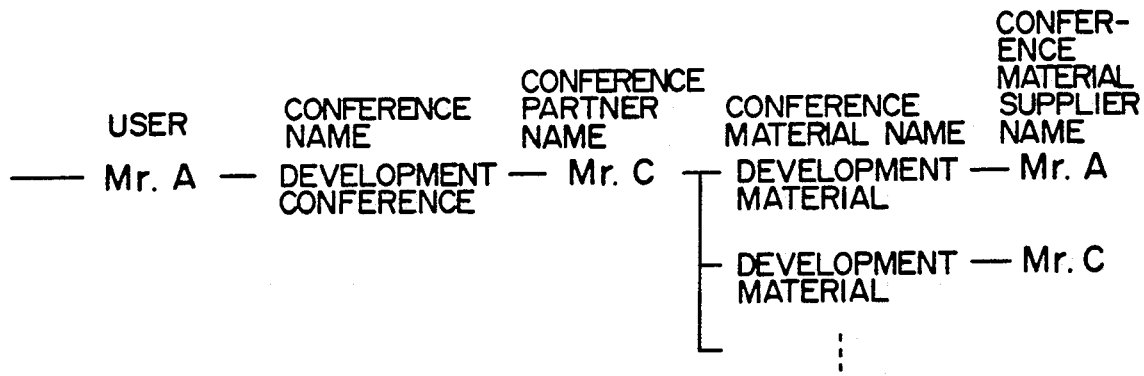
FIG. 3 shows an example of the management of conference materials according to the present invention.

FIG. 3 shows as an embodiment, the inventive management method and apparatus of the present invention for managing materials of conference. The example of management is for conference materials used in the conference of FIG. 1 in which the conference host is Mr. A, the conference name is "Development Conference", and the conference partner is Mr. C.

The conference is managed in the same manner as in the embodiment which has been described with reference to FIG. 1. Since conference materials are identified for management by a logical AND operation of the material name and material supplier, materials of the same name (Development Material supplied by Mr. A and Development Material supplied by Mr. C) can be identified for management, as shown in FIG. 3. This allows the material supplied to make identifiable material names, and they can steadily be identified among the communication conference terminals. This embodiment eliminates the need of prior arrangement between both users for naming conference materials with the anxiety of duplication, and allows the conference host to name the materials irrespective of the names of materials prepared by the conference partner.

Figure 4:
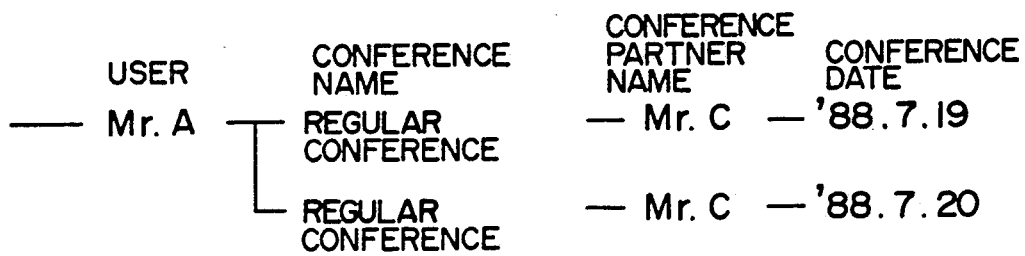
FIG. 4 shows another example of the management of conferences according to the present invention.

FIG. 4 shows another embodiment of the inventive conference management method and apparatus of the present invention. In contrast to the preceding embodiment of FIG. 1 in which conferences are identified for management in terms of the conference host name, conference name and conference partner name, this embodiment identifies conferences for management by a logical AND operation of the conference host name, conference name, conference partner name and, an addition, the data of conference.

FIG. 4 shows an example in which two conferences hosted by Mr. A, named by "Regular Conference", partnered by Mr. C. and held on different days are identified for management.

This embodiment enables the identification for management of regular conferences with the same partner by merely registering one conference name, instead of registering a different conference name for each data of conference. Another advantage is the capability of searching for a conference in terms of the data as the key.

Figure 5:
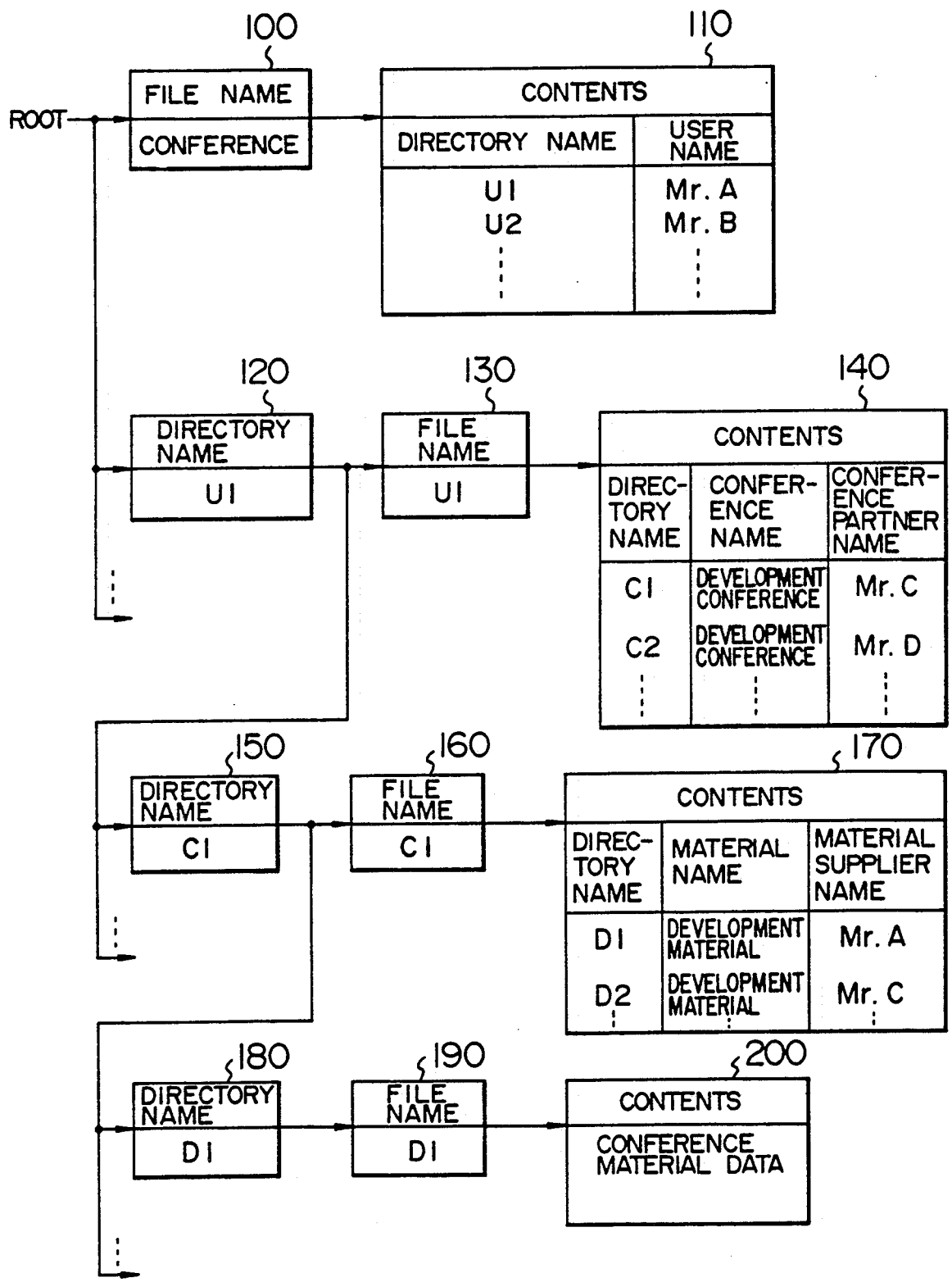
FIG. 5 is a diagram of the file organization which realizes the inventive conference and material management.

FIG. 5 shows an embodiment of this invention for practicing the conference management method and apparatus and conference material management method and apparatus shown in FIGS. 1 and 3. Conferences and conference materials are treated as files under management in a hierarchical directory structure. A file 110 which can be opened at the root directory has a file name of CONFERENCE, and it stores directory names in one-to-one correspondence with the user names registered on the communication conference terminal A 10 by which the file is managed. For example, a directory name U1 is assigned to the user Mr. A. By entering or selecting his name on the communication conference terminal A 10, Mr. A can handle all files which are under management of the directory U1. A new user enters a new user name on the communication conference terminal A 10. The communication conference terminal A 10 automatically assigns a unique directory, which is in one-to-one correspondence with the new user name, to the file 110, thereby creating a conference and conference material management environment for the new user.

Similarly, at a directory named U1 (120), unique directory names that are in one-to-one correspondence with conferences registered by a logical AND operation of the conference name and conference partner name are stored in the file 140 with a file name U1 (130). When the user (Mr. A in this case) specifies a conference name and conference partner name on the communication conference terminal A 10, a directory at the level of conference is selected automatically. In case the conference name is "Development Conference" and the conference partner is Mr. C, a directory name C1 (150) is selected. When the user (Mr. A) has set up a new conference, a directory name which is in one-to-one correspondence with the new conference is assigned automatically to the file 140. In a file 170 with directories of U1 and C1 and a file name of C1 (160), material-level directory names in one-to-one correspondence with the logical AND operations of the material names and material supplier names are stored. Accordingly, the directory names of conference materials used by Mr. A for the Development Conference with Mr. C are stored in the file 170. With the conference name and conference partner name being specified, when Mr. A has specified the material name to be "Development Material" and the material supplier to be Mr. A, a file 200 with a directory name of D1 (180) and a file name of D1 (190) is selected, and a conference material stored in the file 200 is opened and it can be accessed.

According to this embodiment, files at the user level, conference level and material level exist independently, and therefore the addition and deletion of users, the addition and deletion of conferences and the addition and deletion of materials can be done quickly and efficiently. For example, when the Development Conference held by Mr. A and Mr. C is intended to delete on completion of the conference, unless conferences and conference materials are managed in the form of files of the above-mentioned hierarchical directory structure, it is necessary to find the relevant conference and materials by sequentially searching for files that contain the conference and materials, whereas according to this embodiment it can be accomplished quickly by finding the directory names U1 and C1 from the files 110 and 140 and deleting all files having the directory names U1 and C1, eliminating the need for searching for files that contain the materials. Moreover, according to this embodiment, files of one user are not affected by the operation of other users, and it ensure the security against erroneous erasure of one's files by other users or exposure of the content of conference. Conferences set up by Mr. A can be reviewed by opening the file 140, instead of making a list by seeking files as in the conventional system, and conferences pertinent to each user can be displayed quickly.

Figure 7:
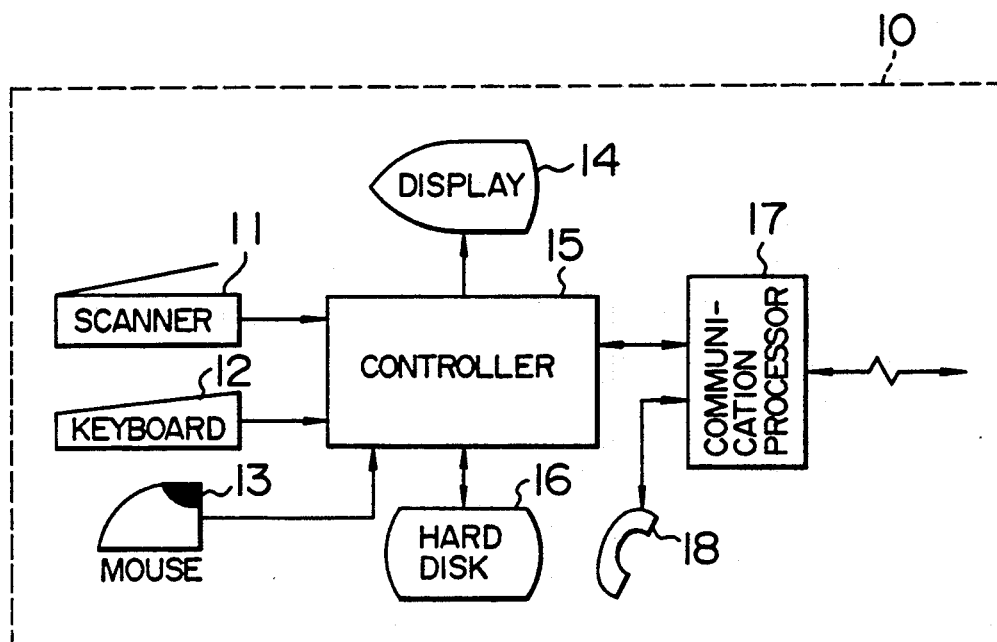
FIG. 7 is a block diagram showing the internal arrangement of the communication conference terminal.

FIG. 7 shows, as an example, the internal arrangement of the communication conference terminal A 10. A scanner 11 is used to enter conference materials. A keyboard 12 is used to register user names, conference names, conference partner names, conference material names, and conference material supplied names. A display unit 14 is used to display a list of conference names for selecting a specific conference and materials at the beginning of the conference, and it is also used to display conference materials during the conference. A mouse device 13 is used for, for example, specifying a specific conference on the conference list displayed on the display unit 14 at the beginning of the conference, and also for the tele-writing and tele-point functions during the conference. A controller 15 is a computer system, and it implements the inventive conference and material management and operates the communication conference. A memory 16 is a hard disk unit, and it has a conference material storage area for materials entered by the scanner 11 and a conference management information storage area. The conference management information area contains the first, second and third files in hierarchical structure, which have been described in connection with FIG. 5, formed by the controller. The first file stores conference host names, the second file stores conference names and conference partner names, and the third file stores conference material names and conference material supplied names. In this embodiment, these areas are partitioned conceptually, instead of being separated in a hardware manner. A communication processor 17 exchanges communication data with the partner terminal in accordance with the command from the controller 15. A handset 18 is used to exchange the voice sound with the conference partner.

Figure 8:
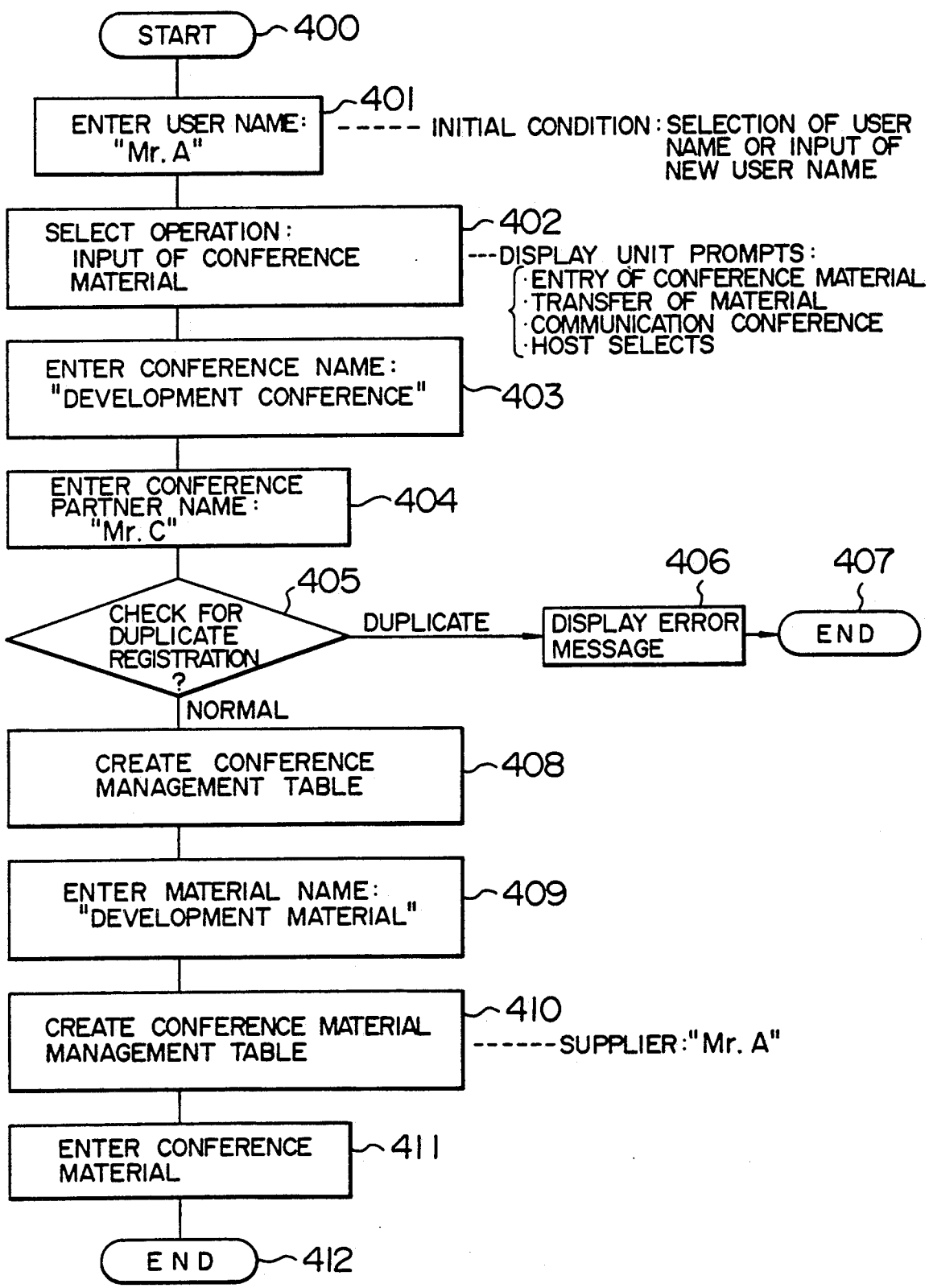
FIG. 8 is a flowchart showing the setup of a communication conference and the input of conference materials on the terminal A.

Next, the communication procedure taken by the conference host (user) in having a communication conference using the communication conference terminal A 10 with a partner (another user) on the communication conference terminal B 30 will be described with reference to FIG. 6. There are two cases of communication conference. One is the setup of a communication conference for the first time, and the other is a recurrent opening of the communication conference for the second and successive times. The setup of a communication conference will be explained first with reference to FIG. 8 which is a flowchart of a communication conference and the entry of conference materials on the terminal A.

The conference host enters the user name (conference host name) on the keyboard 12 of the communication conference terminal A 10 (step 401). Then, the display unit prompts the entry of conference material, transfer of material, or communication conference, and the host selects the entry of conference material (step 402). Next, the host enters a conference name and conference partner name (steps 403, 404). The system implements the duplicate registration check (step 405), and if it is detected an error message is displayed (step 406), or otherwise a conference management table is created (step 408). Subsequently, the host enters material name and material supplier name (step 409), and a conference material management table is created (step 410). These input data are stored in the conference management information storage area of the hard disk 16 under control of the controller 15 within the communication conference terminal A, as has been explained in connection with FIG. 5. The conference material is entered by means of the scanner 11 (step 411), and stored in the conference material storage area of the hard disk 16 thereby to complete the setup of conference on the terminal A (step 412).

Figure 9:
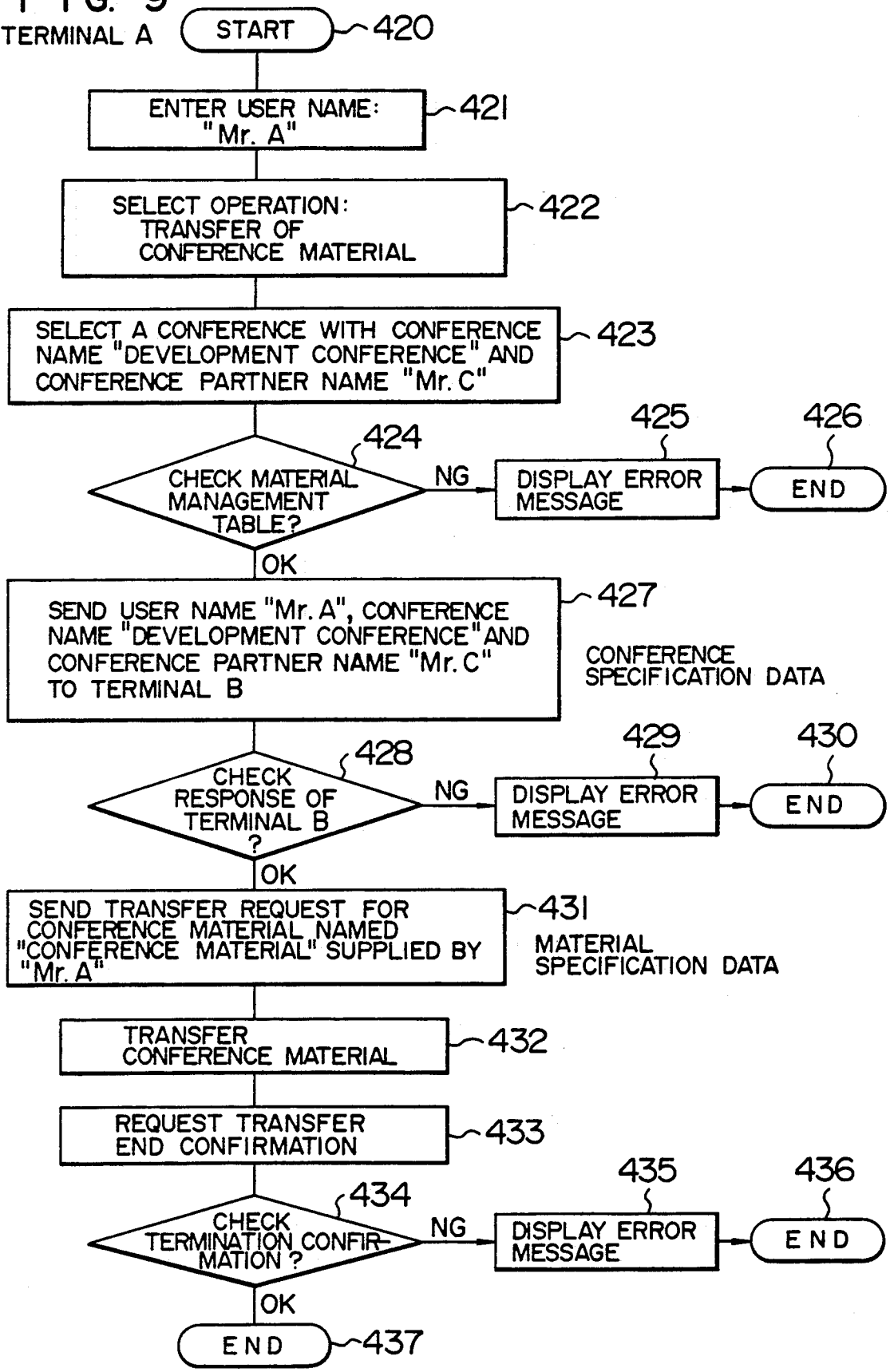
FIGS. 9 and 10 are flowcharts showing the transfer of conference materials before the conference is commenced from the terminal A to terminal B, with FIG. 9 being a flowchart for the terminal A and FIG. 10 being a flowchart for the terminal B.
Figure 10:
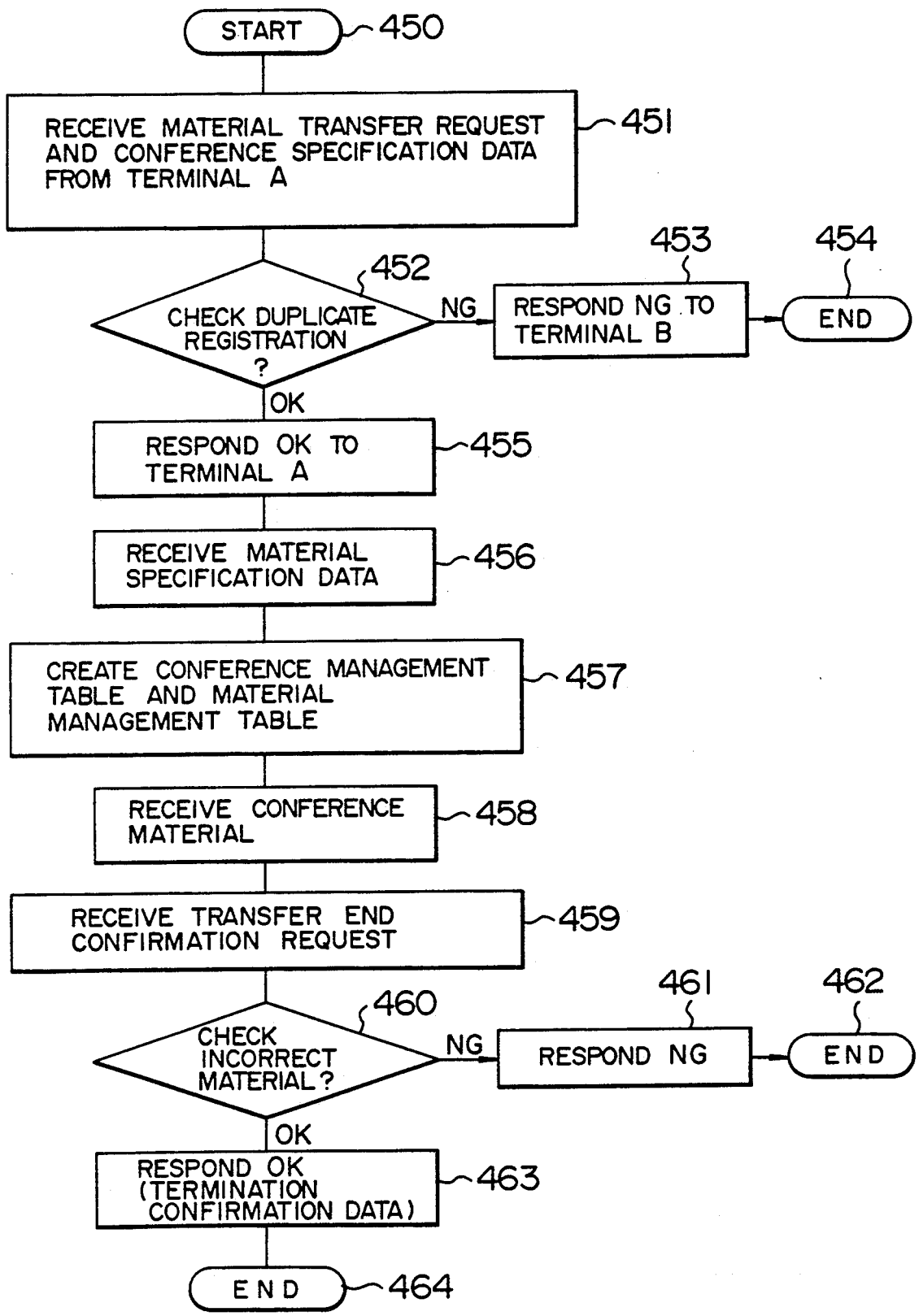

Next, the setup of a conference and transfer of a conference material from the terminal A to terminal B will be explained with reference to the flowchart of FIG. 9 for the terminal A, the flowchart of FIG. 10 for the terminal B, and the figure of management data transaction procedure in FIG. 6. The user on the terminal A enters "Mr. A" for the user name (step 421), selects the "transfer of conference material" for operation (step 422), selects the "development conference" for the conference name, and selects "Mr. C" for the partner name (step 423), thereby designating a conference. The system checks the presence or absence of a material management table (step 424), and in case the conference is selected normally, the controller 15 of the communication conference terminal A (10) sends the communication conference specification data 300, which includes the conference host name, conference name and conference partner name read out of the hard disk unit 16, to the communication conference terminal B (30), and prompts the opening of the communication conference (step 427). On the communication conference terminal B (30), the communication conference specification data is stored in a hierarchical order in the conference management information storage area of the hard disk under control of the controller, in the same manner as for the terminal A, so that it is used for the identification and management of the conference (step 457 in FIG. 10). Receiving the communication conference specification data 300 (step 451), the communication conference terminal B (30), after the duplicate registration check, sends a reply of whether the communication conference is to be accepted (step 455) or rejected (453). In case of acceptance (step 455), the communication conference terminal A (10) sends the conference material specification data (320) including the material name and material supplier name (step 431). These specification data are used also by the communication conference terminal B (30) for the identification and management of the materials (step 457).

Transfer of the conference material specification data is accompanied by the conference material data 330 (step 432), and it is stored in the hard disk unit in the communication conference terminal B (30) and can be accessed on the terminal B. Following the transfer of the conference material, a conference material transfer termination confirmation request 340 (step 433) and a termination confirmation data 350 (step 463) are exchanged then, advance conference material exchange communication is completed, and the conference based on the transferred conference material transferred at 330 is commenced.

Instead of sending separately the conference specification data at (step 427) and the material specification data at (step 431), as described above, both data can be sent concurrently at (step 427).

Although in this embodiment the communication conference specification data comprises a conference host name, conference name and conference partner name, the data may include other information such as a conference holding data, as described in connection with FIG. 4, or in case the material supplier is evident as the source of conference material, the conference material specification data 320 may not include material supplier name.

Furthermore, although in this embodiment the conference material is transferred in advance, communication may be commenced immediately after the conference material is transferred. In the case where the conference material is transferred in advance at least the conference host name, conference name, conference partner name, material name and material supplier name may be sent as the management information together with the conference material. The transfer of the material supplier name can be omitted if it is evident as the material source. In case the conference material is sent in advance, as described above, the conference is set up after the conference material specification data 320 has been sent, and the communication conference based on the specified conference material is held.

Figure 11:
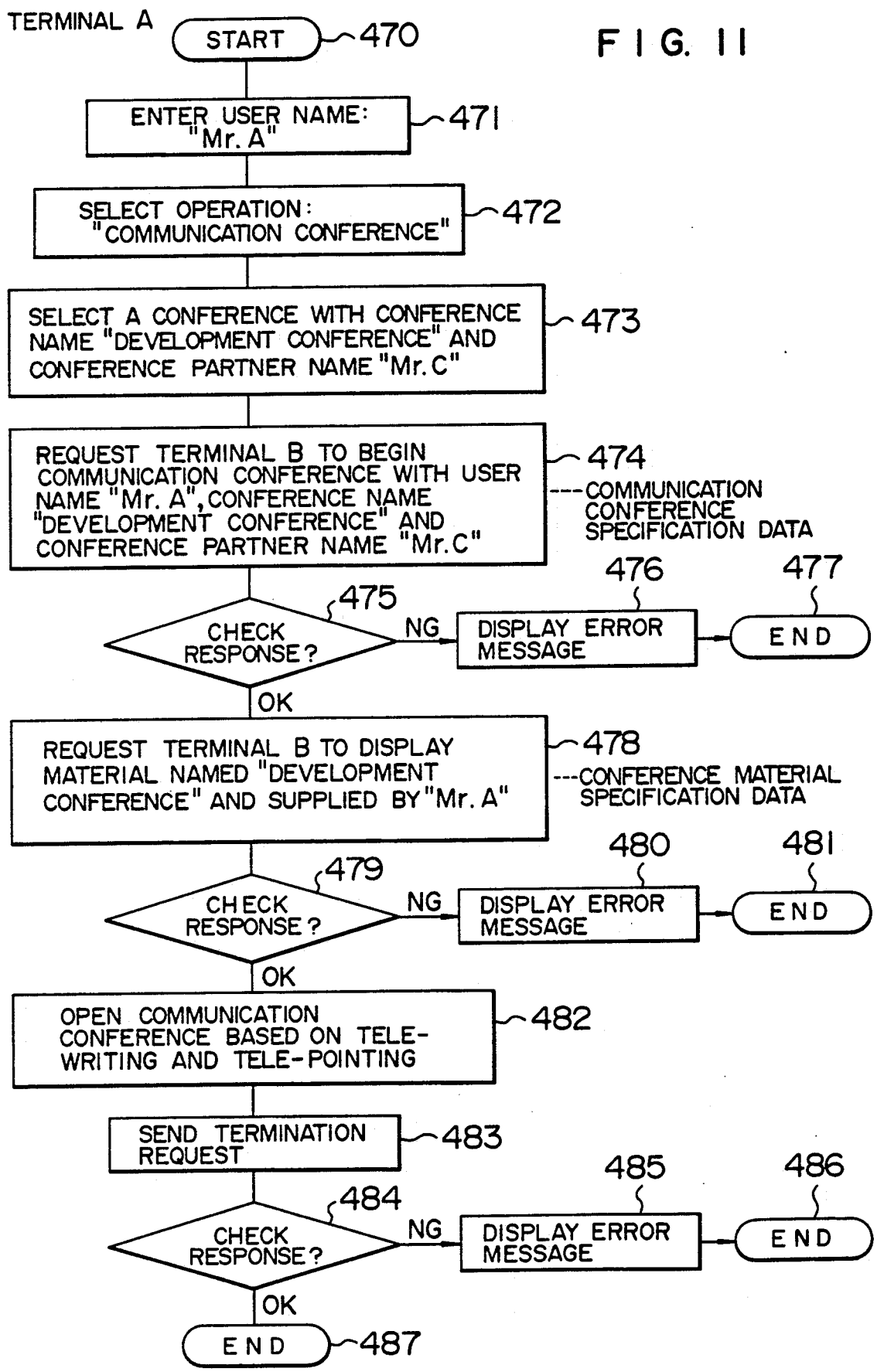

Next, the commencement (call) of a communication conference based on the conference material which was transferred in advance will be explained with reference to the flowcharts of FIGS. 11 and 12 for the terminals A and B. The user who intends to call a conference makes access to the conference management information which is registered on the hard disk 16 of the communication conference terminal A 10. In accessing to the information, the user operates on the controller 15 through the specified operation to display on the display unit 14 the list of conference hosts read out of the first file in the conference management information area, and designates "Mr. A" for the user name using the mouse device 13 (step 471). Next the user selects "communication conference". Subsequently, by designating the user name, a second file is selected and the list of conference names and conference partner names is displayed on the display unit 14, and the user selects the intended conference with the mouse device 13 (step 473). Consequently, a third file is selected and the list of conference material names and conference material supplier names are displayed, and the user designates intended conference materials. As a result of these operations, a conference is designated on terminal A (10), and control proceeds to the next step.

Figure 6:
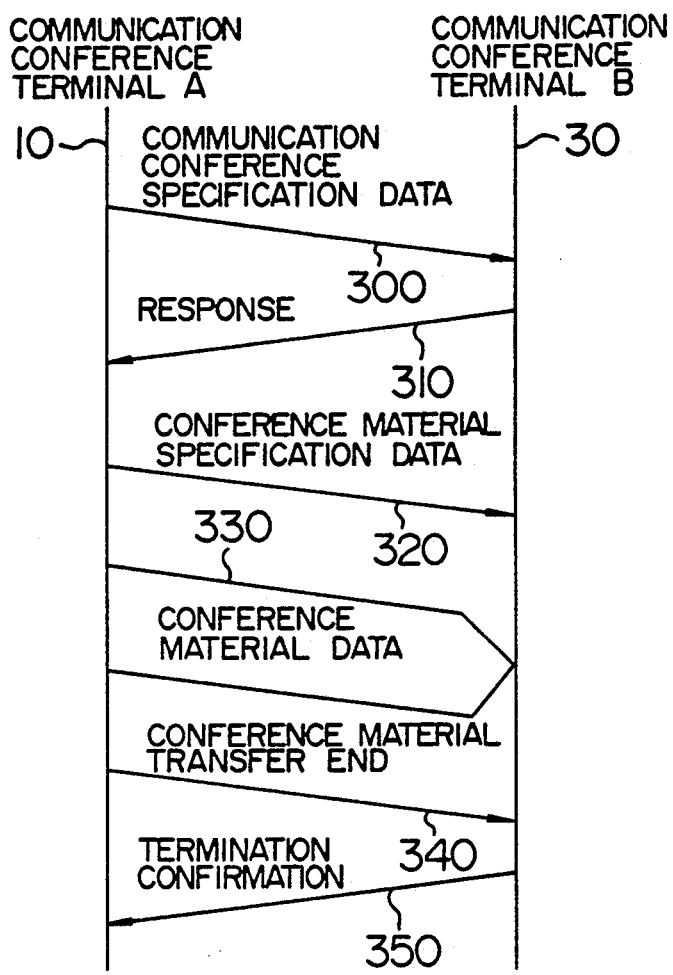
FIG. 6 shows the communication procedure for exchanging management data according to the inventive conference and material management.

As shown in FIG. 6, the communication conference specification data 300 including the conference host name, conference name and conference partner name selected on the terminal A is sent to the terminal B 30 (step 474).

The controller of terminal B responds to the data to identify conference host names, conference names and conference partner names in the first and second files stored hierarchically, so that a specific conference is identified also on the terminal B (step 502). If the conference is not registered, the sequence proceeds to (step 503).

Upon identification on the conference management table, the terminal B (30) sends the confirmation signal 310 to the terminal A 10 (step 504). On receiving the signal, the terminal A sends the conference material specification data 320 including the conference material name and conference material supplier name to the terminal B (step 478). Based on the conference material specification data, the terminal B identifies the conference material in the third file selected in accordance with the above-mentioned identification of the conference (step 506). If the conference material does not exist, the sequence proceeds to (step 508). Following the selection of the conference material thereby confirming that specification data is field in the terminal B, the terminal B sends a conference material transferred termination confirmation signal 350 to the terminal A (step 510), which is checked by the terminal A (step 479), and the preparation of communication conference completes and the communication conference utilizing the tele-writing and tele-pointing functions begins.

According to this embodiment, data for the identification and management of a conference and materials used in the conference are exchanged among the communication conference terminals through which the conference is held, whereby the communication conference is carried out smoothly and steadily.

We claim:

1. A communication conference apparatus in which a plurality of communication conference terminals, each including input means for entering materials used for conferences, a display unit and an audio input-output unit, are connected through a communication network for holding a conference between separated partners by exchanging sounds and images between said separated partners, wherein each of said communication conference terminals comprises:

means for memorizing materials used for conference;
means for registering at least a conference host identifier, conference identifier and conference partner identifier at setup of a conference; and
means for identifying, for management, a specific conference by a logical AND operation of said conference host identifier, said conference identifier and said conference partner identifier which have been registered.

2. A communication conference apparatus according to claim 1, wherein said conference host identifier comprises a conference host name.

3. A communication conference apparatus according to claim 1, wherein said conference identifier comprises a conference name.

4. A communication conference apparatus according to claim 1, wherein said conference partner identifier comprises a conference partner name.

5. A communication conference apparatus in which a plurality of communication conference terminals, each including input means for entering material used for conferences, a display unit and an audio input/output unit, are connected through a communication network for holding a conference between separated partners by exchanging sounds and images between said separated partners, wherein each of said communication conference terminals comprises:

means for memorizing materials used for conferences;
means for registering at least a conference host identifier, conference identifier, conference partner identifier and conference opening identifier at setup of a conference; and
means for identifying, for management, a specific conference by a logical AND operation of said conference host identifier, said conference identifier, said conference partner identifier, and said conference opening identifier which have been registered.

6. A communication conference apparatus according to claim 5, wherein said conference opening identifier comprises a conference opening date.

7. A communication conference apparatus in which a plurality of communication conference terminals, each including input means for entering materials used for conference, a display unit and an audio input/output unit, are connected through a communication network for holding a conference between separated partners by exchanging sounds and images between said separated partners, wherein each of said communication conference terminals comprises:

means for memorizing materials used for conferences;
means for registering at least a conference host identifier, conference identifier and conference partner identifier at setup of a conference, and registering a material identifier and material supplier identifier pertinent to a material used for said conference; and
means for identifying, for management, a specific conference by a logical AND operation of the conference host identifier, conference identifier and conference partner identifier which have been registered, and by a logical AND operation of the material identifier and material supplier identifier which have been registered.

8. A communication conference apparatus in which a plurality of communication conference terminals, each including input means for entering materials used for conferences, a display unit and an audio input/output unit, are connected through a communication network for holding a conference between separated partners by exchanging sounds and images between said separated partners, wherein each of said communication conference terminals comprises:

means for memorizing materials used for conferences, said memorizing means comprising in hierarchical structure a first file which stores information for managing all users who use said communication conference terminals, a second file which exists for each user in said first file for storing information for managing all conferences pertinent to the user, and a third file which exists for each conference in said second file for storing information for managing all materials used for the conference.

9. A communication conference apparatus according to claim 8, wherein said first file stores at least one of directory names of file names of second files in one-to-one correspondence to the users, said second file stores at least one of directory names or file names of third files in one-to-one correspondence to logical AND operations of conference identifiers and conference partner identifiers of conferences pertinent to the user determined from the directory name of second file, and said third file stores at least one of directory names or file names of material files in one-to-one correspondence to logical AND operations of the material identifiers and material supplier identifiers of the materials used for the conference determined from the directory name of second file or directory name of third file.

10. A communication conference apparatus in which a plurality of communication conference terminal, each including input means for entering materials used for conferences, memory means having an area for storing the conference materials and an area for storing conference management information, display means, audio input/output means, and control means for controlling conferences and conference materials, are connected through communication means for holding a conference between separated partners by exchanging sounds and images between said separated partners, said apparatus further comprising:

means included in said control means for memorizing at least a conference host identifier, conference identifier and conference partner identifier in hierarchical manner in the conference management information storage area of said memory means at setup of a conference, and identifying conferences stores in the conference management information area by a logical AND operation of the conference host identifier, conference identifier and conference partner identifier.

11. A communication conference apparatus in which a plurality of communication conference terminals, each including input means for entering material used for conference, memory means having an area for storing the conference materials and an area for storing conference management information, display means, audio input/output means, and control means for controlling conferences and conference materials, are connected through communication means for holding a conference between separated partners by exchanging sounds and images between said separated partners, said apparatus further comprising:

means included in said control means for memorizing at least a conference host identifier, conference identifier, conference partner identifier and conference material identifier in hierarchical manner in the conference management information storage area of said memory means at setup of a conference, and reading out a specific conference material stored in the conference material storage area of said memory means by determining the conference material by a logical AND operation of the conference host identifier, conference identifier, conference partner identifier and material identifier.

12. A communication conference apparatus in which a plurality of communication conference terminals, each including input means for entering material used for conferences, memory means having an area for storing the conference materials and an area for storing conference management information, display means, audio input/output means, and control means for controlling conferences and conference materials, are connected through communication means for holding a conference between separated partners by exchanging sounds and images between said separated partners, said system further comprising:

wherein said management information storage area of said memory means is formed to include a first storage file, a second storage file and a third storage file in hierarchical fashion;

said control means including means for setting up a conference by registering a conference host identifier, which is registered in the management information storage area, in said first storage file, registering a conference identifier and conference partner identifier in said second storage file, and registering a material identifier and material supplier identifier in said third storage file, and means for storing a conference material in the conference management information storage area of said memory means and identifying said conference material by specifying a conference host identifier stored in said first storage file, specifying a communication identifier and conference partner identifier stored in said second storage file, and specifying a material identifier and/or material supplier identifier stored in said third storage file.

13. A communication conference apparatus according to claim 7, wherein said communication conference terminals comprise a first communication conference terminal and at least one second communication conference terminal, and wherein a communication conference held between the first and second communication conference terminals is set up through a data transaction that comprises the steps of:

(a) sending communication conference specification data which includes a conference host identifier, conference identifier and conference partner identifier from the first communication conference terminal to the second communication conference terminal;

(b) receiving, by the first communication conference terminal from the second communication conference terminal, a conference commencement acceptance signal for said conference specification data;

(c) sending conference material specification data, which includes at least a material identifier, from the first communication conference terminal to the second communication conference terminal; and (d) receiving, by the first communication conference terminal from the second communication conference terminal, a termination confirmation signal for said material specification data.

14. A communication conference apparatus according to claim 11, wherein said communication conference terminals comprise a first communication conference terminal and at least one second communication conference terminal, and wherein a communication conference held between the first and second communication conference terminals is set up through a data transaction that comprises the steps of:

(a) sending communication conference specification data which includes a conference host identifier, conference identifier and conference partner identifier from the first communication conference terminal to the second communication conference terminal;

(b) receiving, by the first communication conference terminal from the second communication conference terminal, a conference commencement acceptance signal for said conference specification data;

(c) sending conference material specification data, which includes at least a material identifier, from the first communication conference terminal to the second communication conference terminal; and (d) receiving, by the first communication conference terminal from the second communication conference terminal, a termination confirmation signal for said material specification data.

15. A communication conference method for a communication conference apparatus in which a plurality of communication conference terminals, each including input means for entering materials used for conferences, memory means having an area for storing the conference materials and an area for storing conference management information, display means, audio input/output means, and control means for controlling conferences and conference materials, are connected through communication means for holding a conference between separated partners by exchanging sounds and images between said separated partners, comprising the steps of:

memorizing at least a conference host identifier, conference identifier, conference partner identifier and conference material identifier in hierarchical manner in the conference management information storage area of said memory means at setup of a conference; and reading out a specific conference material stored in the conference material storage area of said memory means by determining the conference material by a logical AND operation of the conference host identifier, conference identifier, conference partner identifier and material identifier.

16. A communication conference method for a communication conference apparatus in which a plurality of communication conference terminals, each including input means for entering materials used for conferences, memory means having an area for storing the conference materials and an area for storing conference management information, display means, audio input-output means, and control means for controlling conferences and conference materials, are connected through communication means for holding a conference between separated partners by exchanging sounds and images between said separated partners, comprising the steps of:

forming said management information storage area of said memory means to include a first storage file, a second storage file and a third storage file in hierarchical fashion;

setting up a conference by registering a conference host identifier, in the management information storage area, in said first storage file;

registering a conference identifier and conference partner identifier in said second storage file;

registering a material identifier and material supplier identifier in said third storage file;

identifying a conference material stored in the conference management information storage area of said memory means by specifying a conference host identifier stored in said first storage file;

specifying a communication identifier and conference partner identifier stored in said second storage file; and specifying a material identifier and/or material supplier identifier stored in said third storage file.

17. A communication conference method for a communication conference apparatus in which a plurality of communication conference terminals, each including input means for entering materials used for conferences, a display unit and an audio input/output unit, are connected through a communication network for holding a conference between separated partners by exchanging sounds and images between said separated partners, comprising the steps of:

memorizing materials used for conferences:

registering at least a conference host identifier, conference identifier and conference partner identifier at setup of a conference, and registering a material identifier and material supplier identifier pertinent to a material used for said conference; and identifying for management a specific conference by a logical AND operation of the conference host identifier, conference identifier and conference partner identifier which have been registered, and by a logical AND operation of the material identifier and material supplier identifier which have been registered.

18. A communication conference method for a communication conference apparatus according to claim 17, wherein said communication conference terminals comprise a first communication conference terminal and at least one second communication conference terminal, and wherein a communication conference held between the first and second communication conference terminals is set up through a data transacting step that comprises the substeps of:

(a) sending a communication conference specification data which includes a conference host identifier, conference identifier and conference partner identifier from the first communication conference terminal to the second communication conference terminal;

(b) receiving, by the first communication conference terminal from the second communication conference terminal, a conference commencement acceptance signal or said conference specification data;

(c) sending conference material specification data, which includes at least a material identifier, from the first communication conference terminal to the second communication conference terminal; and (d) receiving, by the first communication conference terminal from the second communication conference terminal, a termination confirmation signal for said material specification data.

19. A communication conference method according to claim 15, wherein said communication conference terminals comprise a first communication conference terminal and at least one second communication conference terminal, and wherein a communication conference held between the first and second communication conference terminals is set up through a data transacting step that comprises the substeps of:

(a) sending communication conference specification data which includes a conference host identifier, conference identifier and conference partner identifier from the first communication conference terminal to the second communication conference terminal;

(b) receiving, by the first communication conference terminal from the second communication conference terminal, a conference commencement acceptance signal for said conference specification data;

(c) sending conference material specification data, which includes at least a material identifier, from the first communication conference terminal to the second communication conference terminal; and (d) receiving, by the first communication conference terminal from the second communication conference terminal, a termination confirmation signal for said material data.

* * * * *